United States Patent [19]

Ebner et al.

[11] 4,118,711

[45] Oct. 3, 1978

[54] FONT SUPPORT ASSEMBLY FOR A PHOTOTYPESETTING MACHINE

[75] Inventors: Peter R. Ebner, South Nashua; Louis E. Griffith, Hampstead, both of N.H.

[73] Assignee: Itek Corporation, Lexington, Mass.

[21] Appl. No.: 747,761

[22] Filed: Dec. 6, 1976

Related U.S. Application Data

[63] Continuation of Ser. No. 619,104, Oct. 2, 1975, abandoned.

[51] Int. Cl.[2] .......... G03B 17/6; G03B 17/10; G03B 17/18

[52] U.S. Cl. .......... 354/15; 354/19; 354/292

[58] Field of Search .......... 354/15, 19, 292, 13, 354/14, 16; 346/137

[56] References Cited

U.S. PATENT DOCUMENTS

| | | | |
|---|---|---|---|
| 3,821,770 | 6/1974 | Rosenstein et al. | 354/292 |
| 3,886,566 | 5/1975 | Moyroud et al. | 354/15 |
| 4,015,273 | 3/1977 | Linde et al. | 354/15 |

*Primary Examiner*—John Gonzales

*Attorney, Agent, or Firm*—Homer O. Blair; Robert L. Nathans; Gerald H. Glanzman

[57] ABSTRACT

A plurality of outwardly and radially extending font segment support arms are coupled to a central hub which is rotated to sequentially present the letters formed upon the segments to an optical imaging station which selectively projects optical images of the letters upon a photosensitive medium. Vertical shoulder portions are precision machined upon outer portions of the radially extending support members for precisely positioning the arcuate character tracks on the segments with respect to the imaging station. Horizontal plates are affixed to the radially extending support members to support the segments against gravity and centrifugal force is employed to precisely seat the segments against the vertically oriented shoulder portions upon rotation of the hub.

29 Claims, 3 Drawing Figures

FONT SUPPORT ASSEMBLY FOR A PHOTOTYPESETTING MACHINE

This is a continuation, of application Ser. No. 619,104, filed Oct. 2, 1975, now abandoned.

BACKGROUND OF THE INVENTION

Most manufacturers of phototypesetting machines place several fonts on one disc or film strip carrier with the entire disc or film strip being replaceable when it is desired to change fonts. It is known in the art that it is advantageous to separate a unitary disc into segments such as a number of pie-shaped disc portions so that each may be replaced on an individual basis upon the selection of a new font. Several manufacturers have employed such a segmental font system with the individual font segments being accurately located by expensive alignment pins and holes. However, since the mounting accuracy should be typically less than one mil, very little clearance exists between the holes and the guide pins which makes the segments difficult to replace and expensive to manufacture. Difficulty in replacement increases operator burdens and slows down such replacement.

Another approach is illustrated in U.S. Pat. No. 3,886,566 wherein the segments are seated against an inner arcuate portion and are cemented or screwed down against an outwardly extending shoulder portion. This approach is believed impracticable since high accuracy cannot be consistently maintained. It is also desirable to eliminate the use of screws or cement and provide for rapid, easy segment replacement.

SUMMARY OF THE INVENTION

In accordance with a preferred embodiment of the present invention, a plurality of outwardly and radially extending arms are coupled to a central rotatable hub and a vertical reference shoulder portion is precision machined at outer portions of the support members so that upon rotation of the hub, centrifugal force is employed to accurately seat the segments against the shoulder portions. Horizontally oriented retaining plates are affixed to the support members for supporting the segments against gravity. The arrangement provides for extremely accurate radial placement of the font tracks without fastening devices of any kind which enables the operator to easily and rapidly replace the segments.

Other objects, features and advantages will become apparent upon the perusal of the following detailed description taken in conjunction with the drawings in which.

DETAILED DESCRIPTION

Figure 1:
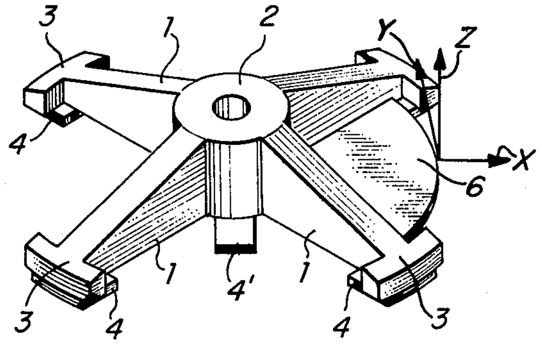
FIG. 1 illustrates an overall perspective view of the assembly.
Figure 2:
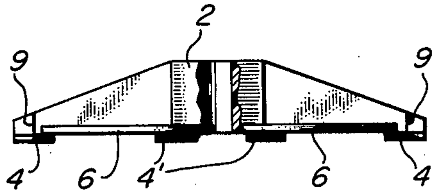
FIG. 2 illustrates a side view of the assembly.

Outwardly extending arms are provided, which are coupled to hub 2 and have outer portions which terminate in members 3 which have the above-mentioned vertically oriented reference shoulder portions machined in each member. Horizontal plates 4 are illustrated which support pie-shaped font segments 6 against gravity. The three degrees of translational freedom, *x*, *y*, and *z*, are illustrated by orthogonal vectors. Since the plane of the segments are perpendicular to the optical projection axis, character focus is affected only by *z* variations. Since the depth of focus at the font plane is about plus or minus 5 mils, alignment accuracy in the *z* axis is not critical. Alignment in the *y* axis is a function of flash timing and is independent of font segment position since the clock track on the segments control flash timing. Thus, only alignment in the radial direction represented by the *x* vector is critical. The above-mentioned vertically oriented reference shoulder portions 9, shown in FIG. 2, are formed by grinding, after the mounting of the assembly on the drive shaft 7, and may be readily controlled very accurately with respect to its radial position. This procedure minimizes any "radial run out" of the surface and establishes excellent radial alignment of the font segments. The retaining plates 4 are thereafter attached to create a land on which the font segments rest.

Font segments 6 are rapidly and easily placed upon the above-mentioned horizontally oriented support plates 4 as illustrated. Centrally located support plates 4' are coupled to the hub portion to fully support the font segments. Upon the rotation of hub 2, typically at a speed of 1800 rpm, centrifugal force causes the segments to be firmly seated against the inwardly facing vertically oriented precision machined shoulder portions 9 as illustrated in FIG. 2.

When it is desired to change a font segment, the machine is stopped and the segment is easily and rapidly lifted out of the assembly and a replacement segment is readily dropped into the assembly.

Figure 3:
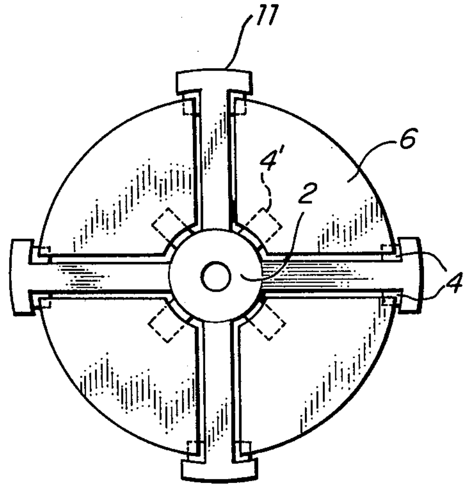
FIG. 3 illustrates a top view of FIG. 2.

In the actual prototypes constructed by the inventors, four arms were employed. Each terminal portion 11 has the above-mentioned retaining plates positioned to support one corner of two adjacent segments as is apparent from the inspection of FIG. 3.

The actual prototype constructed by the inventors produced very accurate radial alignment of the font tracks and excellent results were obtained. This prototype employed an assembly having an overall diameter of 9 inches and which was rotated at a speed of 1800 rpm. Each segment was made of plexiglass and had an approximate weight of $\frac{1}{8}$ pound.

In summary, in contrast with the prior art, the present invention provides for easy and rapid segment replacement with high radial alignment accuracy together with ease of manufacture.

While a preferred device of the invention has been described, the teachings of this invention will readily suggest many other embodiments to those skilled in the art.

What is claimed is:

1. A font support device for supporting flat font segments having indicia referencing edge portions transverse to the major surfaces thereof for a phototype-setting machine comprising:

a. a hub member rotatable about a vertical axis;

b. outwardly and radially extending font segment support members coupled to said hub member for horizontally supporting said flat font segments; and c. alignment reference shoulder portions formed upon inwardly facing surfaces of said font support members for radially referencing said edge portions of said font segments upon rotation of said hub in a direction transverse to said vertical axis of said hub member.

2. The combination as set forth in claim 1 further including additional font segment support members coupled to outer portions of the first-mentioned font support members in the neighborhood of said alignment reference shoulder portions for further supporting said font segments.

3. The combination as set forth in claim 2 wherein said additional font segment support members comprise horizontal plates.

4. A segmented font support device for supporting horizontally oriented font segments for a phototypesetting machine comprising:

a. a hub member rotatable about a vertical axis;

b. a first set of outwardly and radially extending font segment support members coupled to said hub member;

c. vertically oriented font segment alignment reference shoulder portions formed upon said first set of font support members for radially referencing the edges of said segments upon rotation of said hub member by centrifugal force in a horizontal direction; and d. a second set of font segment support members for supporting said horizontally oriented font segments against gravity.

5. The combination as set forth in claim 4 wherein said first set of outwardly and radially extending font segment support members include elongated arms coupled to said hub member.

6. The combination as set forth in claim 4 wherein said vertically oriented font segment alignment reference shoulder portions face said hub member.

7. The combination as set forth in claim 5 wherein said vertically oriented font segment alignment reference shoulder portions face said hub member.

8. The combination as set forth in claim 5 wherein said first set of font segment support members extend on either side of said elongated arms to support outer portions of two adjacent font segments.

9. The combination as set forth in claim 4 wherein said second set of font segment support members include horizontally oriented plates coupled to said hub member.

10. The combination as set forth in claim 6 wherein said second set of font segment support members include horizontally oriented plates coupled to said hub member.

11. A support device for supporting font segments for a phototypesetting machine comprising:

a. a rotatable hub member for supporting four outwardly and radially extending segment support arms coupled to said hub member at positions so that adjacent support arms are perpendicular to each other to define four quadrants for containing four font segments;

b. vertically oriented inwardly facing precision machined font segment alignment reference shoulder portions formed upon outer portions of said arms for radially and horizontally referencing the edges of said segments through the use of centrifugal force; and c. horizontal support plates coupled to said outer portions of each of said arms for supporting said segments against gravity.

12. The combination as set forth in claim 11 further including horizontal support plates coupled to said hub.

13. The combination as set forth in claim 12 wherein said outer portions of said arms further include elongated portions generally perpendicular to the longitudinal axis of said arms for supporting said horizontal support plates.

14. A font support device for supporting font segments for a phototypesetting machine comprising:

a. a hub member rotatable about an axis of rotation;

b. a plurality of flat font segments having referencing edge portions transverse major surface portions thereof;

c. outwardly and radially extending font segment support members coupled to said hub member for supporting said font segments; and d. alignment reference shoulder portions formed upon inwardly facing surfaces of outer portions of said font support members and oriented parallel to the longitudinal axis of rotation of said hub for contacting said referencing edge portions of said font segments for radially referencing outer portions of said font segments by centrifugal force upon rotation of said hub in a direction transverse said axis of rotation of said hub member.

15. The combination as set forth in claim 14 further including additional font segment support members coupled to outer portions of the first-mentioned font support members in the neighborhood of said alignment reference shoulder portions for further said font segments.

16. The combination as set forth in claim 15 wherein said additional font segment support members comprise horizontal plates.

17. A segmented font support device for supporting horizontally oriented font segments for a phototypesetting machine comprising:

a. a rotatable hub member;

b. a plurality of rigid, flat horizontally oriented font segments having referencing edge portions formed thereon;

c. a first set of outwardly and radially extending font segment support members coupled to said hub member for horizontally supporting said font segments;

d. vertically oriented font segment alignment reference shoulder portions formed upon outer portions of said first set of font support members for contacting said referencing edge portions of said font segments for radially referencing said segments upon rotation of said hub by virtue of centrifugal force; and e. a second set of font segment support members coupled to said first set of font segment support members for horizontally supporting said horizontally oriented font segments against gravity.

18. The combination as set forth in claim 17 wherein said outwardly and radially extending font segment support members are elongated arms coupled to said hub member.

19. The combination as set forth in claim 17 wherein said vertically oriented font segment alignment reference shoulder portions face said hub member.

20. The combination as set forth in claim 18 wherein said vertically oriented font segment alignment reference shoulder portions face said hub member.

21. The combination as set forth in claim 19 wherein said second set of font segment support members extend on either side of said first set of support members to support outer portions of two adjacent font segments.

22. The combination as set forth in claim 17 wherein said second set of font segment support members comprise horizontally oriented plates coupled to said first set of font segment support members.

23. The combination as set forth in claim 19 wherein said second set of font segment support members comprise horizontally oriented plates coupled to said first set of font segment support members.

24. A font support device for supporting font segments for a phototypesetting machine comprising:

a. a hub member for supporting four outwardly and radially extending segment support arms coupled to said hub member at positions so that adjacent support arms are perpendicular to each other to define four quadrants for containing four font segments;

b. vertically oriented inwardly facing precision machined font segment alignment reference shoulder portions formed upon outer portions of said arms for radially referencing edges of said segments through the use of centrifugal force; and c. horizontal support plates coupled to said outer portions of each of said arms for supporting said segments against gravity.

25. The combination as set forth in claim 24 further including horizontal support plates coupled to said hub.

26. The combination as set forth in claim 25 wherein said outer portions of said arms further include elongated portions generally perpendicular to the longitudinal axis of said arms for supporting said horizontal support plates.

27. A method of manipulating font segments having edge portions transverse major surface portions thereof in a phototypesetter having an optical axis and which need not require fastening said segments to said phototypesetter, comprising the steps of:

a. providing a font segment support device including
   (1) a hub member;
   (2) outwardly and radially extending font segment support members coupled to said hub member;
   (3) alignment reference shoulder portions formed upon inwardly facing surfaces of outer portions of said font segment support members for radially referencing said outer reference edge portions of said font segments in a direction transverse said optical axis;

b. placing said font segments upon said font segment support members; and c. rotating said hub member at a sufficient speed to cause said font segment reference edge portions to be pressed against said alignment reference shoulder portions of said font segment support members for radially referencing said outer portions of said font segments upon rotation of said hub.

28. A font segment for use solely in a phototype-setting machine having an optical axis along which images of indicia to be typeset are projected, said phototypesetting machine including font segment support means for supporting said font segments thereon, said font segment support means being rotatable about a longitudinal axis thereof, and having alignment reference surface portions formed upon portions of said font segment support means facing inwardly towards said longitudinal axis for radially referencing indicia referencing edge portions of said font segments by centrifugal force in a radial direction transverse to said optical axis upon rotation of said font segment support means, said font segment having:

a. two major planar surface portions having indicia to be projected located on at least one of said planar surface portions;

b. outwardly facing font segment indicia referencing edge portions, transverse to said major surface portions and facing away from said longitudinal axis, for contacting said font segment support alignment reference surface portions upon rotation of said font segment support means, so that when said font segment support means, so that when said font segment support means is rotated, centrifugal force will force said outwardly facing font segment indicia referencing edge portions against said inwardly facing alignment reference surface portions, thereby eliminating the need to fasten said font segments to said support device.

29. The font segment of claim 28 wherein said major planar surface portions are flat and parallel to one another.

* * * * *

UNITED STATES PATENT OFFICE
CERTIFICATE OF CORRECTION

Patent No. 4,118,711 Dated October 3, 1978

Inventor(s) Peter R. Ebner and Louis E. Griffith

It is certified that error appears in the above-identified patent and that said Letters Patent are hereby corrected as shown below:

In Column 6, Line 31, cancel "so that when".

In Column 6, Line 32, cancel "said font segment support means,".

Signed and Sealed this

*Seventeenth* Day of *July 1979*

[SEAL]

*Attest:*

LUTRELLE F. PARKER

*Attesting Officer* *Acting Commissioner of Patents and Trademarks*